(No Model.)

C. G. THAYER.
BICYCLE.

No. 312,930. Patented Feb. 24, 1885.

Witnesses:

Inventor:
C. G. Thayer,
By S. W. Sinsabaugh
Attorney.

UNITED STATES PATENT OFFICE.

CHARLES G. THAYER, OF FREDONIA, NEW YORK, ASSIGNOR OF ONE-HALF TO O. M. GAWNE, OF SAME PLACE.

BICYCLE.

SPECIFICATION forming part of Letters Patent No. 312,930, dated February 24, 1885.

Application filed December 27, 1884. (No model.)

*To all whom it may concern:*

Be it known that I, C. G. THAYER, a citizen of the United States, residing at Fredonia, in the county of Chautauqua and State of New York, have invented certain new and useful Improvements in Bicycles, of which the following is a specification, reference being had therein to the accompanying drawings.

My invention relates to improvements in bicycles.

The object of my invention is to provide a device which will obviate accidents to bicycle-riders and prevent the tipping up of the backbone and small wheel secured thereto, and the swinging or tipping forward of the "fork" over the main wheel, so as to throw the rider onto the ground in front of the machine over the handle-bars.

My invention consists of the automatic clamping of the large wheel of a bicycle to the fork and attachments by means of a clutch.

My invention consists, further, of a clutch secured to the fork of the bicycle in such a manner that when the body of the rider, with the fork, is thrown forward a clutch will be brought into contact with the periphery of the wheel and automatically clamp the wheel, so as to connect it with the fork saddle and backbone of the machine, which prevents the wheel from turning backward or the further forward motion of the fork over the wheel and the tipping up of the backbone.

My invention consists, further, in certain details of construction, which will be fully described hereinafter, and pointed out in the claims.

Figure 1:
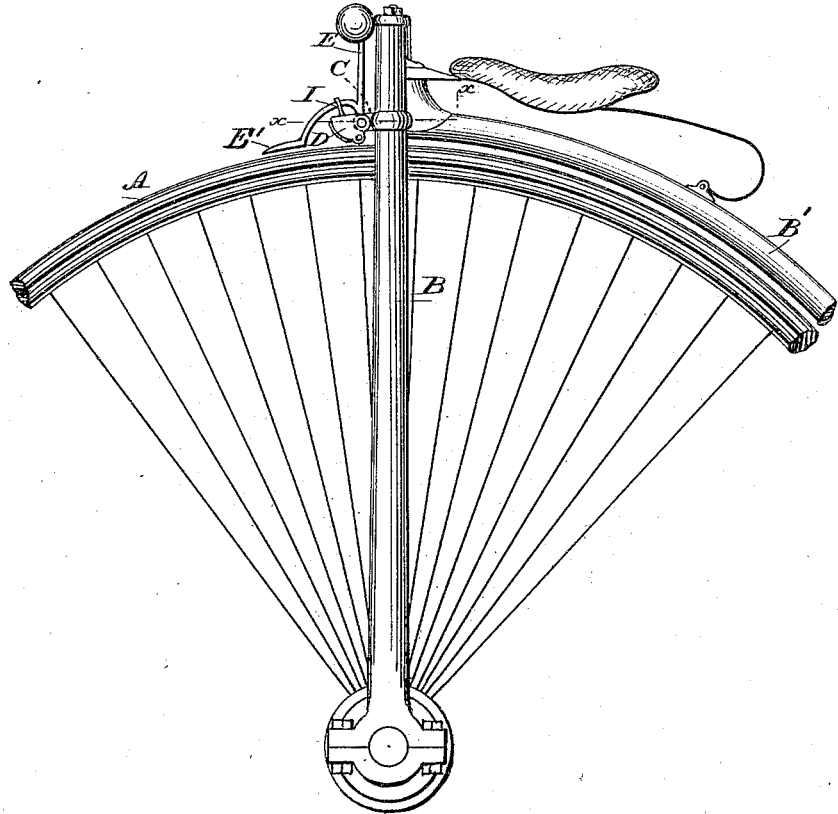
Figure 2:
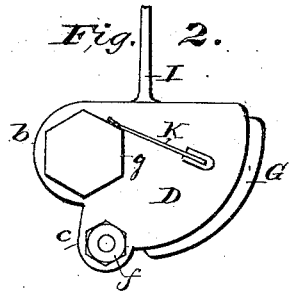
Figure 3:
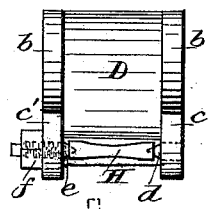
Figure 4:
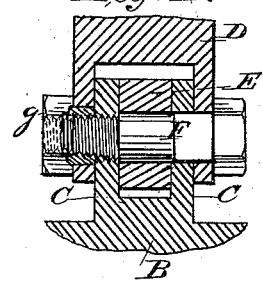
Figure 5:
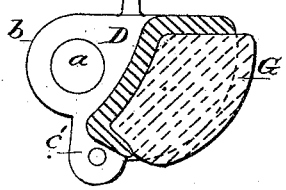

Referring to the drawings, Figure 1 is a side view of a portion of a bicycle with my improvement applied thereto. Fig. 2 is a side view of my improved clutch. Fig. 3 is a bottom view. Fig. 4 is an enlarged sectional view, showing the attachment of the clutch to the yoke or fork of the machine, as indicated by the dotted lines $x$ $x$, Fig. 1. Fig. 5 is a vertical sectional view showing the rubber packing.

A is the main driving-wheel of the machine, which is of the usual well-known construction, and B′ is the backbone, to which the rear wheel is attached.

B is the yoke or fork provided with projecting lugs C, to which the shell D of the safety-clutch is attached, and also the vertical bar E, to which the brake-shoe E′ is secured, as shown on an enlarged scale in Fig. 4.

As before intimated, the shell of the safety-clutch is attached to the projecting lugs C of the yoke B by means of the bolt F, and is free to turn on said bolt, so that when the rubber packing of the clutch is in contact with the rubber tire of the wheel it will serve to arrest the backward motion of the wheel or the forward movement of the fork.

The shell D of the clutch is made of any suitable metal, is cam-shaped in general outline, and is secured eccentrically to the lugs of the yoke by passing the bolt F through the holes $a$ in the lugs $b$ and through the lugs C of the york or fork.

The shell D is made hollow, or with one open side, as shown, into which cavity is placed a rubber block or packing, G, which conforms to the exterior shape of the shell and projects slightly beyond the edge of the same, so that when the backbone of the machine is raised and the fork thrown slightly forward the rubber packing G, being in contact with the periphery of the wheel, will prevent the further forward movement of the fork and the rider, and thus cause the machine to come to a stop without throwing the rider from his seat.

H is a friction-roller secured in the lugs $c$ $c'$ of the shell D in the following manner:

$d$ is a tapering or pointed lug secured firmly in the lug $c$, while $e$ is a movable pin having also a pointed end, and is screw-threaded to enter a screw-threaded aperture in the lug $c'$. The ends of the roller H are recessed to receive the points of the pins or lugs $d$ $e$, while the external surface may be concave to conform to the convex surface of the tire on the wheel A.

$f$ is a lock-nut adapted to screw onto the pin $e$ and hold the same in position when properly adjusted with relation to the roller H.

It may not be convenient or desirable to have the clutch in position to operate on the wheel at all times—as, for instance, when traveling in daylight or over smooth roads—and, in order to raise the clutch and hold it in an elevated position, I raise the clutch by means of the handle I, and bring the spring K in contact with the upper edge of the bolt-head g, as shown in Fig. 2, which holds the clutch away from the wheel and in an elevated position.

From the foregoing description it is obvious that the chances of accidents from "headers" are reduced to a minimum, and that I produce a device which is light, inexpensive, and can be applied to all bicycles now in use.

Having thus described my invention, what I claim, and desire to secure by Letters Patent, is—

1. A device for preventing headers and other accidents to bicycle-riders, consisting of a block of rubber forming a non-rotative clutch secured to the fork of the machine, close to the periphery of the wheel, as set forth, whereby the fork and backbone are automatically clamped to the wheel by the forward movement of the fork.

2. A device for preventing headers and other accidents in bicycle-riding, consisting of a case or shell having a rubber block or packing secured therein, said case being secured to the front part of the fork, and close to the periphery of the main driving-wheel, as set forth.

3. In a bicycle, the fork B, provided with the lugs C, in combination with the case or shell D, rubber packing G, and friction-roller H, as and for the purpose set forth.

4. A device for preventing headers and other accidents in bicycle-riding, consisting of a cam-shaped metallic shell or case provided with a similarly-shaped rubber block or packing which projects beyond the edge of the shell, said shell being secured to lugs formed on the front portion of the fork, and close to the periphery of the main driving-wheel, as set forth.

5. In a device for preventing headers and other accidents in bicycle-riding, the shell or clutch D, provided with the pin $d$, in combination with the roller H, movable pin $e$, and lock-nut $f$, as and for the purpose set forth.

6. The shell D, pivoted, as described, to the yoke B, provided with the handle I, in combination with the spring K, and bolt-head $g$, whereby the clutch is raised and kept from contact with the wheel, as set forth.

In testimony whereof I affix my signature in presence of two witnesses.

CHARLES G. THAYER.

Witnesses:
O. M. GAWNE,
ZACH TAYLOR.